(12) United States Patent
Lee

(10) Patent No.: US 8,087,362 B2
(45) Date of Patent: Jan. 3, 2012

(54) CART AND TRACK ARRANGEMENT

(75) Inventor: Yi-Lung Lee, Taichung Hsien (TW)

(73) Assignee: Tera Autotech Corporation, Tachia, Taichung Hsien (TW)

( * ) Notice: Subject to any disclaimer, the term of this patent is extended or adjusted under 35 U.S.C. 154(b) by 366 days.

(21) Appl. No.: 12/559,096

(22) Filed: Sep. 14, 2009

(65) Prior Publication Data
US 2011/0061562 A1 Mar. 17, 2011

(51) Int. Cl.
*B60B 17/00* (2006.01)

(52) U.S. Cl. .......... 104/306; 104/242; 104/244

(58) Field of Classification Search .......... 104/306, 104/242, 244, 245, 247
See application file for complete search history.

(56) References Cited

U.S. PATENT DOCUMENTS

| | | | | |
|---|---|---|---|---|
| 3,869,989 A * | 3/1975 | Pickstone | ...... | 104/94 |
| 4,015,537 A * | 4/1977 | Graef et al. | ...... | 104/91 |
| 4,160,611 A * | 7/1979 | Hveding | ...... | 405/2 |
| 4,230,043 A * | 10/1980 | Aldington | ...... | 104/306 |
| 4,494,464 A * | 1/1985 | Fujita | ...... | 105/170 |
| 5,355,805 A * | 10/1994 | Haab et al. | ...... | 104/106 |
| 6,523,480 B1 * | 2/2003 | Jensen | ...... | 104/118 |
| 7,363,864 B2 * | 4/2008 | Broek | ...... | 104/106 |
| 7,891,303 B2 * | 2/2011 | Dupont et al. | ...... | 105/215.1 |
| 2002/0117076 A1 * | 8/2002 | Saiz | ...... | 104/106 |
| 2007/0119333 A1 * | 5/2007 | Dupont et al. | ...... | 105/72.2 |
| 2010/0071582 A1 * | 3/2010 | Andre et al. | ...... | 104/244 |
| 2011/0061562 A1 * | 3/2011 | Lee | ...... | 104/306 |

* cited by examiner

*Primary Examiner* — Joe Morano, IV
*Assistant Examiner* — Jason C Smith
(74) *Attorney, Agent, or Firm* — Muncy, Geissler, Olds & Lowe, PLLC

(57) ABSTRACT

A cart and track arrangement includes a track unit having a straight track and a curved track, the straight track having an oblique bearing portion, the curved track having a horizontal bearing portion, and a cart having a cart frame and a wheel set, the wheel set having a wheel axle arranged in parallel to the oblique bearing portion of the straight track and a wheel pivotally mounted on the wheel axle, the wheel having a first tread disposed in parallel to the wheel axle for rotatably supporting on the oblique bearing portion of the straight track and a second tread for rotatably supporting on the horizontal bearing portion of the curved track. In an alternate form, the straight track has a horizontal bearing portion, the curved track has an oblique bearing portion, and the wheel has a first tread disposed in parallel to the wheel axle for rotatably supporting on the horizontal bearing portion of the straight track and a second tread for rotatably supporting on the oblique bearing portion of the curved track.

16 Claims, 6 Drawing Sheets

CART AND TRACK ARRANGEMENT

BACKGROUND OF THE INVENTION

1. Field of the Invention

The present invention relates to cart and track technology and more particularly the arrangement between a cart and a track unit.

2. Description of the Related Art

In order to overcome the effect of a centrifugal force during turning of a cart on a track, the outer rail of the track is usually arranged at an elevation relatively higher than the inner rail around the turning point. However, the cart or cab will tilt when moving over the turning point.

To avoid the aforesaid tilting problem, a high-class cart may be equipped with a suspension system so that the cab can be kept in horizontal when moving over the turning point. However, this suspension system is complicated and quite expensive, not practical for use in an ordinary transportation cart.

Accordingly, there is a strong demand for a cart and track arrangement that eliminates the aforesaid problems.

SUMMARY OF THE INVENTION

The present invention has been accomplished under the circumstances in view. It is the main object of the present invention to provide a cart and track arrangement, which has a simple structural design and which enables the cart to be kept in horizontal when running in another direction, minimizing centrifugal force.

To achieve this and other objects of the present invention, a cart and track arrangement comprises a track unit and a cart. The track unit comprises a straight track and a curved track connected to the straight track curvedly. The straight track comprises an oblique bearing portion transversely downwardly sloping from one lateral side thereof at a predetermined angle and longitudinally extending along the length of the straight track. The curved track comprises a horizontal bearing portion longitudinally extending along the length thereof. The cart comprises a cart frame, and a wheel set mounted on the cart frame and rotatably supported on the track unit. The wheel set comprises a wheel axle, and a wheel pivotally mounted on the wheel axle. The wheel axle is arranged in parallel to the oblique bearing portion of the straight track. The wheel comprises a first tread disposed in parallel to the wheel axle for rotatably supporting on the oblique bearing portion of the straight track, and a second tread for rotatably supporting on the horizontal bearing portion of the curved track.

Further, the oblique bearing portion can be formed integrally with a part of the straight track of the track unit, or separately made and then detachably fastened to the straight track of the track unit.

Further, the cart comprises a spacer ring sleeved onto the wheel axle and stopped between the cart frame and the wheel of the wheel set to prohibit the wheel set from axial displacement.

Further, the spacer ring is disposed at a side of the wheel corresponding to a radially inward side of the curved track of the track unit.

Further, the rack unit comprises a guide roller bearing portion. Further, the cart comprises at least one guide roller rotatably supported on the guide roller bearing portion of the tack unit.

Further, the second tread is located at a side of the first tread corresponding to a radially inward side of the curved track of the tack unit.

Further, the second tread is located at a side of the first tread corresponding to a radially outward side of the curved track of the track unit.

In an alternate form of the present invention, a cart and track arrangement comprises a track unit and a cart. The track unit comprises a straight track and a curved track connected to the straight track curvedly. The straight track comprises a horizontal bearing portion longitudinally extending along the length thereof. The curved track comprises an oblique bearing portion transversely downwardly sloping from one lateral side thereof at a predetermined angle and longitudinally extending along the length of the curved track. The cart comprises a cart frame, and a wheel set mounted on the cart frame and rotatably supported on the track unit. The wheel set comprises a wheel axle, and a wheel pivotally mounted on the wheel axle. The wheel axle is arranged in parallel to the horizontal bearing portion of the straight track. The wheel comprises a first tread disposed in parallel to the wheel axle for rotatably supporting on the horizontal bearing portion of the straight track, and a second tread for rotatably supporting on the oblique bearing portion of the curved track.

Further, the oblique bearing portion can be formed integrally with a part of the curved track of the track unit, or separately made and then detachably fastened to the curved track of the track unit.

DETAILED DESCRIPTION OF THE INVENTION

Figure 1:
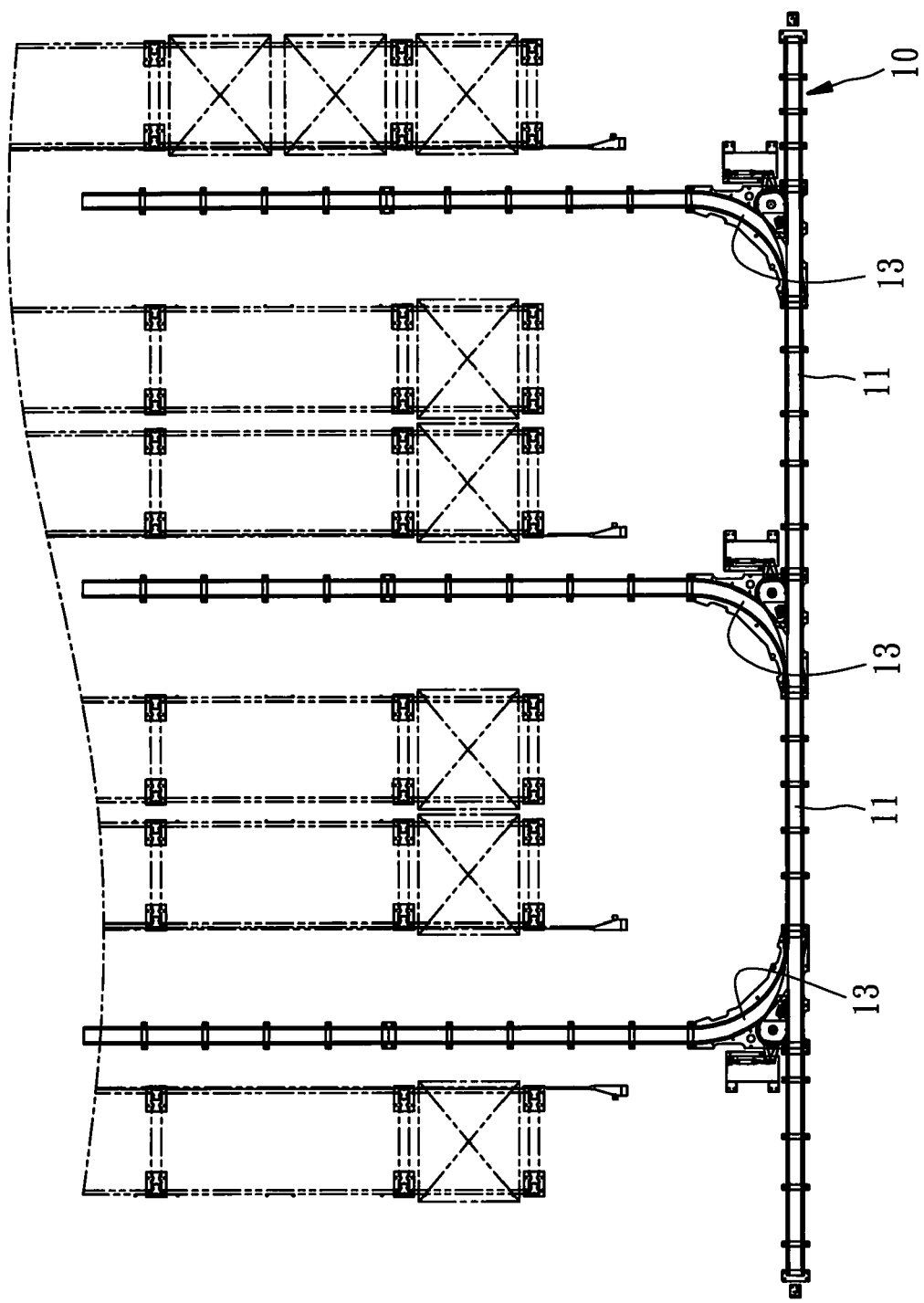
FIG. 1 is a schematic drawing of a track of a cart and track arrangement in accordance with a first embodiment of the present invention.
Figure 2:
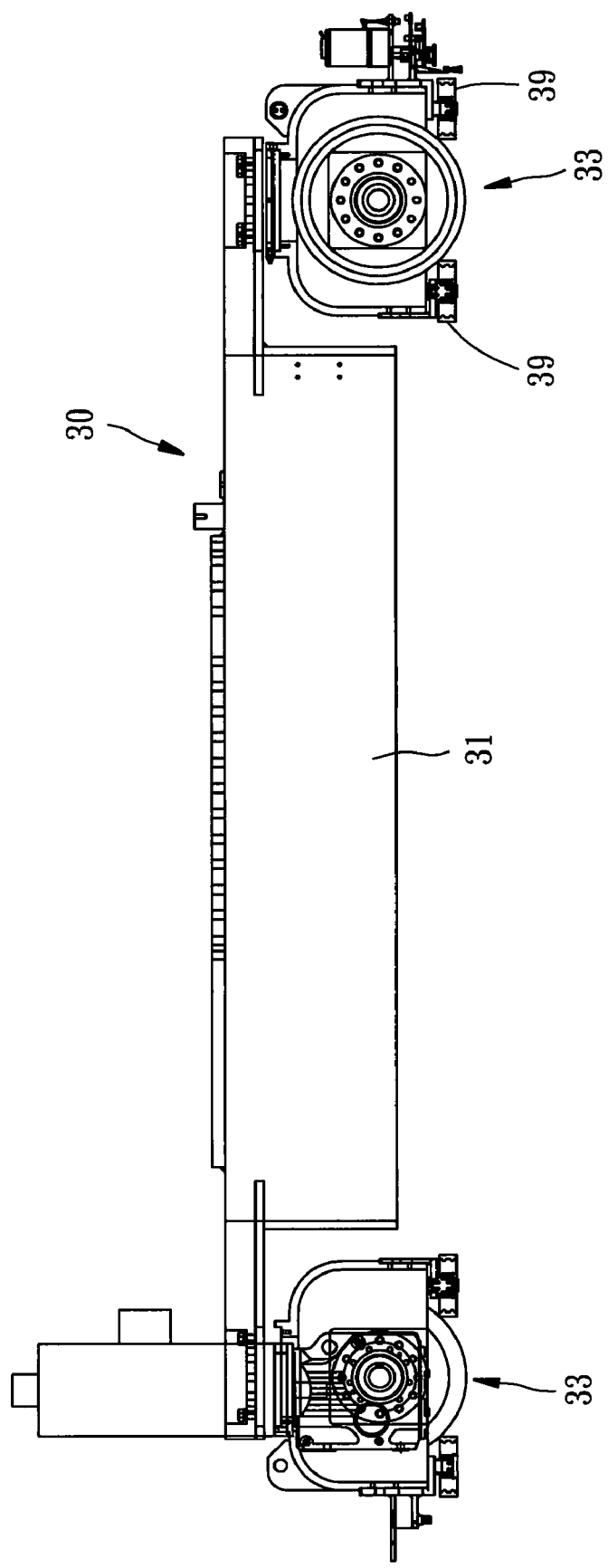
FIG. 2 is a schematic side view of the cart of the cart and track arrangement in accordance with the first embodiment of the present invention.

Referring to FIG. 1, a cart and track arrangement in accordance with a first embodiment of the present invention is shown comprising a track unit 10 and a cart 30.

The track unit 10 comprises a straight track 11, and a curved track 13 connected to the straight track 11 curvedly. The straight track 11 comprises an oblique bearing portion 15 transversely downwardly sloping from one lateral side toward the midline thereof at a predetermined angle and longitudinally extending along the length. The curved track 13 comprises a horizontal bearing portion 17 longitudinally extending along the length. Further, a guide roller bearing portion 19 is provided at the track unit 10.

The cart 30 comprises a cart frame 31 and a wheel set 33 mounted on the cart frame 31. The wheel set 33 comprises a wheel axle 35 and a wheel 36 pivotally mounted on the wheel axle 35. The wheel axle 35 is arranged in parallel to the oblique bearing portion 15 of the straight track 11. The wheel 36 comprises a first tread 361 disposed in parallel to the wheel axle 35 for rotatably supporting on the oblique bearing portion 15 of the straight track 11, and a second tread 362 for rotatably supporting on the horizontal bearing portion 17 of the curved track 13.

The cart 30 further comprises two guide rollers 39 respectively arranged at front and rear sides relative to the wheel 36 and rotatably supported on the guide roller bearing portion 19 of the track unit 10 to prohibit excessive lateral displacement.

The component parts of the present invention have further features as described hereinafter.

The oblique bearing portion 15 of the straight track 11 of the track unit 10 can be formed integral with the straight track 11. Alternatively, the oblique bearing portion 15 can be separately made and then detachably fastened to the straight track 11 of the track unit 10.

The cart 30 further comprises a spacer ring 37 sleeved onto the wheel axle 35 and stopped between the cart frame 31 and the wheel 36 of the wheel set 33 to prohibit the wheel set 33 from axial displacement.

Further, the spacer ring 37 is disposed at a side of the wheel 36 corresponding to a radially inward side of the curved track 13 of the track unit 10.

The cart 30 further comprises a keyless axle bush 38 mounted in between the wheel axle 35 and the wheel 36.

The operation of the first embodiment of the present invention is outlined hereinafter.

Figure 3:
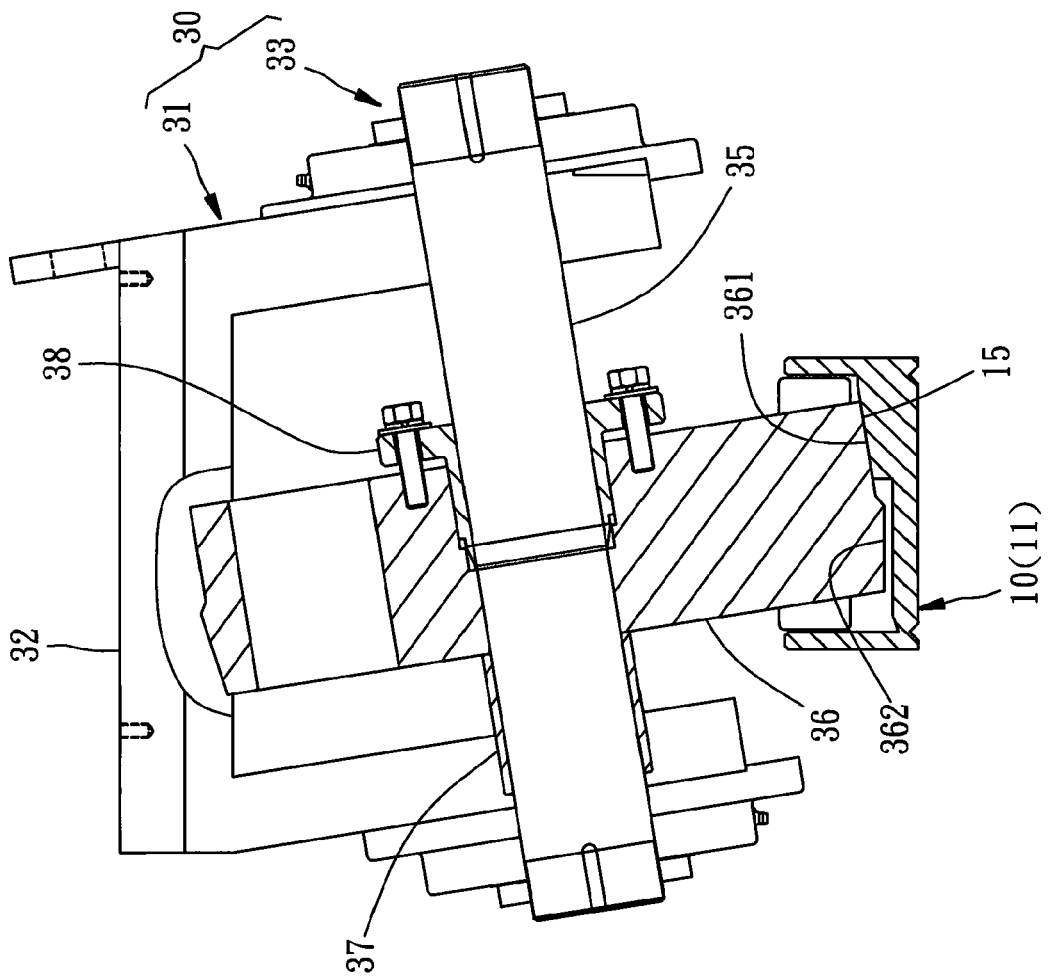
FIG. 3 is a schematic sectional view of the first embodiment of the present invention, showing the cart moved on the straight track of the track unit.

FIG. 3 illustrates a running status of the cart 30 on the straight track 11 of the track unit 10. As illustrated, the first tread 361 of the wheel 36 is kept in contact with the oblique bearing portion 15 of the straight track 11 of the track unit 10 and the wheel axle 35 of the cart 30 is kept in a tilted position, however the load-carrying surface 32 of the cart frame 31 is kept in horizontal.

Figure 4:
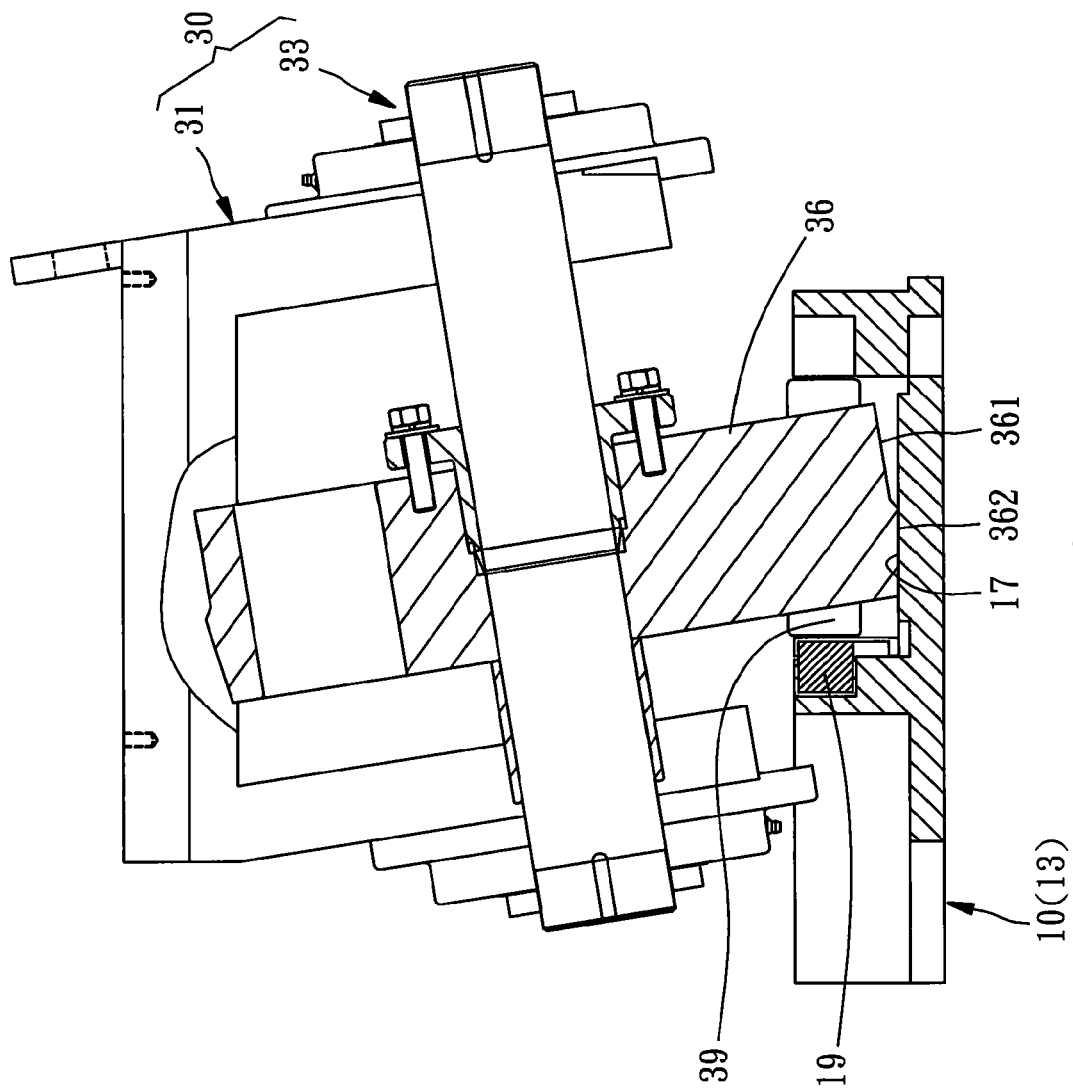
FIG. 4 is a schematic sectional view of the first embodiment of the present invention, showing the cart moved on the curved track of the track unit.

When the cart 30 is moved curvedly away from the straight track 11 of the track unit 10 into the curved track 13, as shown in FIG. 4, the second tread 362 of the wheel 36 is kept in contact with the horizontal bearing portion 17 of the curved track 13 of the track unit 10 and the wheel axle 35 of the cart 30 is kept in a tilted position, keeping the load-carrying surface 32 of the cart frame 31 in horizontal and minimizing centrifugal force.

Figure 5:
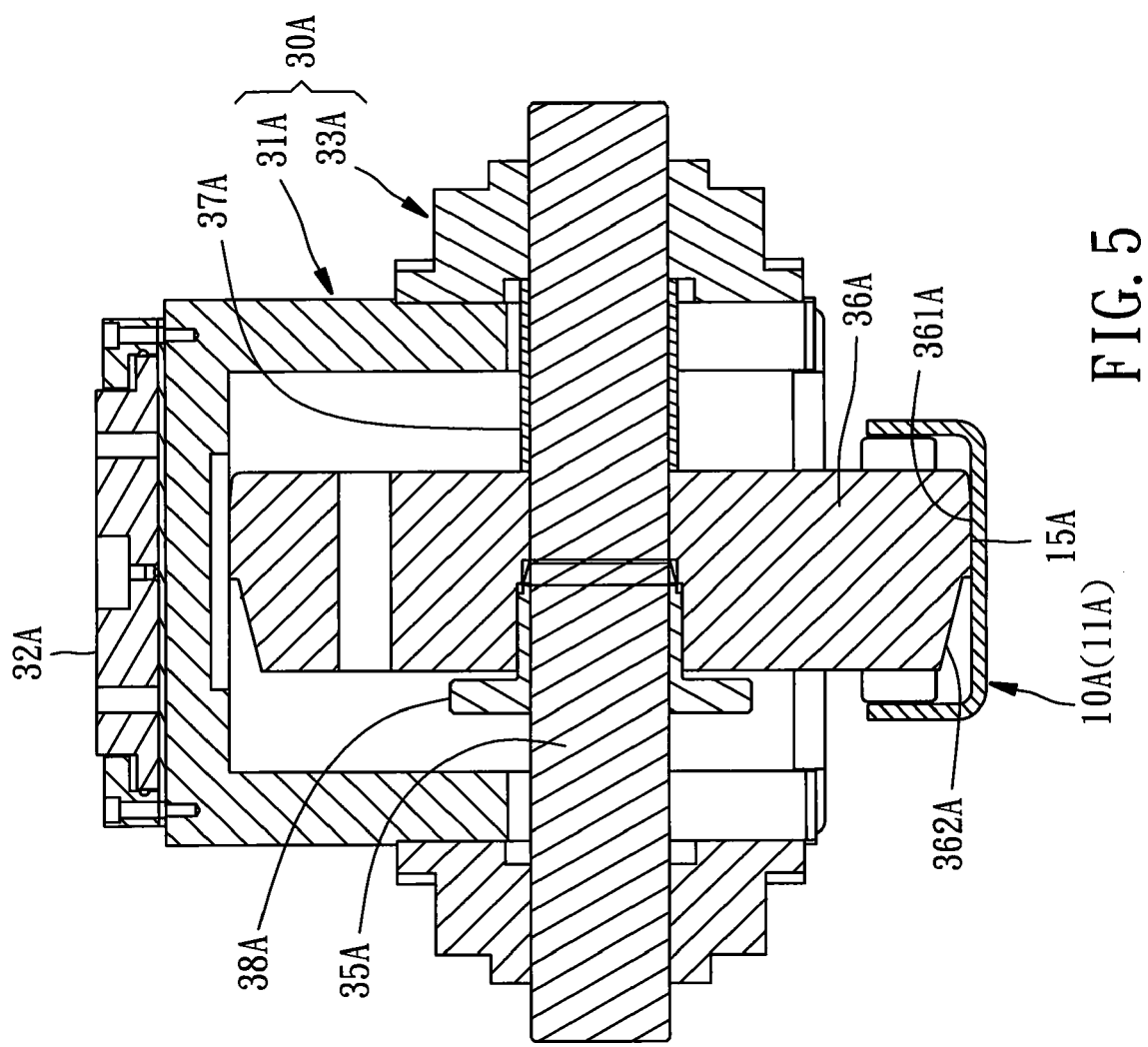
FIG. 5 is a schematic sectional view, showing a cart moved on a straight track of a track unit in accordance with a second embodiment of the present invention.
Figure 6:
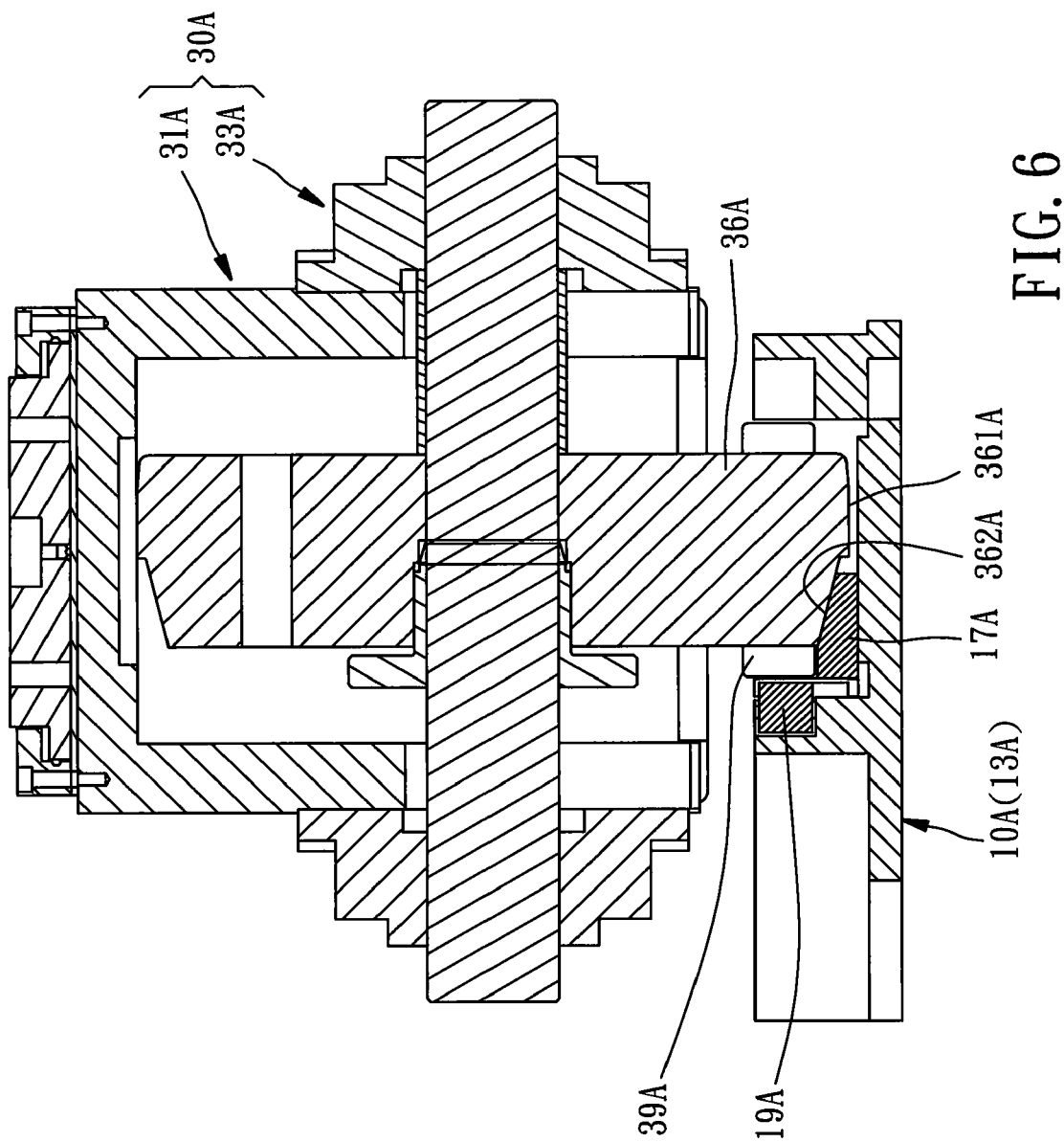
FIG. 6 is a schematic sectional view of the second embodiment of the present invention, showing the cart moved on the curved track of the track unit.

FIGS. 5 and 6 show a cart and track arrangement in accordance with a second embodiment of the present invention. As illustrated, the cart and track arrangement comprises a track unit 10A and a cart 30A.

The track unit 10A comprises a straight track 11A, and a curved track 13A connected to the straight track 11A curvedly. The straight track 11A comprises a horizontal bearing portion 15A longitudinally extending along the length. The curved track 13A comprises an oblique bearing portion 17A transversely downwardly sloping from one lateral side toward the midline thereof at a predetermined angle and longitudinally extending along the length.

The cart 30A comprises a cart frame 31A and a wheel set 33A mounted on the cart frame 31A. The wheel set 33A comprises a wheel axle 35A and a wheel 36A. The wheel axle 35A is arranged in parallel to the horizontal bearing portion 15A of the straight track 11A. The wheel 36A comprises a first tread 361A disposed in parallel to the wheel axle 35A for rotatably supporting on the horizontal bearing portion 15A of the straight track 11A, and a second tread 362A for rotatably supporting on the oblique bearing portion 17A of the curved track 13A.

According to this second embodiment, the cart 30A also comprises a spacer ring 37A and a keyless axle bush 38A arranged in the same way as the like parts in the aforesaid first embodiment.

This second embodiment further comprises a guide roller bearing portion 19A provided at the track unit 10A, and two guide rollers 39A arranged on the cart 30A at front and rear sides relative to the wheel 36A and kept in contact with the guide roller bearing portion 19A to prohibit the cart 30A from excessive lateral displacement.

The operation of this second embodiment of the present invention is outlined hereinafter.

FIG. 5 illustrates a running status of the cart 30A on the straight track 11A of the track unit 10A. As illustrated, the first tread 361A of the wheel 36A is kept in contact with the horizontal bearing portion 15A of the straight track 11A of the track unit 10A; the wheel axle 35A of the cart 30A is kept in horizontal; the load-carrying surface 32A of the cart frame 31 is kept in horizontal.

When the cart 30A is moved curvedly away from the straight track 11A of the track unit 10A into the curved track 13A, as shown in FIG. 6, the second tread 362A of the wheel 36A is kept in contact with the oblique bearing portion 17A of the curved track 13A of the track unit 10A and the wheel axle 35A of the cart 30A is kept in a horizontal, minimizing centrifugal force.

The oblique bearing portion 17A of the curved track 13A of the track unit 10A can be formed integral with the curved track 13A. Alternatively, the oblique bearing portion 17A can be separately made and then detachably fastened to the curved track 13A of the track unit 10A.

Further, the spacer ring also can be disposed at a side of the wheel corresponding to a radially outward side of the curved track of the track unit, or the cart comprises two spacer rings disposed at two sides of the wheel respectively.

Still further, either the second tread can be located at a side of the first tread corresponding to a radially inward side of the curved track of the track unit, or the second tread can be located at a side of the first tread corresponding to a radially outward side of the curved track of the track unit.

In conclusion, the invention provides a cart and track arrangement, which has a simple structural design and which enables the cart to be kept in horizontal when running in another direction, minimizing centrifugal force.

What is claimed is:

1. A cart and track arrangement, comprising:
a track unit, said track unit comprising a straight track and a curved track connected to said straight track curvedly, said straight track comprising an oblique bearing portion transversely downwardly sloping from one lateral side thereof at a predetermined angle and longitudinally extending along the length of said straight track, said curved track comprising a horizontal bearing portion longitudinally extending along the length thereof, and
a cart, said cart comprising a cart frame and a wheel set mounted on said cart frame and rotatably supported on said track unit, said wheel set comprising a wheel axle and a wheel pivotally mounted on said wheel axle, said wheel axle being arranged in parallel to said oblique bearing portion of the straight track, said wheel comprising a first tread disposed in parallel to said wheel axle for rotatably supporting on the oblique bearing portion of said straight track and a second tread for rotatably supporting on the horizontal bearing portion of said curved track.

2. The cart and track arrangement as claimed in claim 1, wherein said oblique bearing portion is detachably fastened to the straight track of said track unit.

3. The cart and track arrangement as claimed in claim 1, wherein said oblique bearing portion is formed integrally with a part of the straight track of said track unit.

4. The cart and track arrangement as claimed in claim 1, wherein said cart further comprises a spacer ring sleeved onto said wheel axle and stopped between said cart frame and said wheel of the wheel set to prohibit said wheel set from axial displacement.

5. The cart and track arrangement as claimed in claim 4, wherein said spacer ring is disposed at a side of said wheel corresponding to a radially inward side of the curved track of said track unit.

6. The cart and track arrangement as claimed in claim 1, wherein said track unit further comprises a guide roller bearing portion; said cart further comprises at least one guide roller rotatably supported on said guide roller bearing portion of the track unit.

7. The cart and track arrangement as claimed in claim 1, wherein said second tread is located at a side of said first tread corresponding to a radially inward side of said curved track of the track unit.

8. The cart and track arrangement as claimed in claim 1, wherein said second tread is located at a side of said first tread corresponding to a radially outward side of said curved track of the track unit.

9. A cart and track arrangement, comprising:
a track unit, said track unit comprising a straight track and a curved track connected to said straight track curvedly, said straight track comprising a horizontal bearing portion longitudinally extending along the length thereof, said curved track comprising an oblique bearing portion transversely downwardly sloping from one lateral side thereof at a predetermined angle and longitudinally extending along the length of said curved track; and
a cart, said cart comprising a cart frame and a wheel set mounted on said cart frame and rotatably supported on said track unit, said wheel set comprising a wheel axle and a wheel pivotally mounted on said wheel axle, said wheel axle being arranged in parallel to the horizontal bearing portion of said straight track, said wheel comprising a first tread disposed in parallel to said wheel axle for rotatably supporting on said horizontal bearing portion of the straight track and a second tread for rotatably supporting on said oblique bearing portion of the curved track.

10. The cart and track arrangement as claimed in claim 9, wherein said oblique bearing portion is detachably fastened to the curved track of said track unit.

11. The cart and track arrangement as claimed in claim 9, wherein said oblique bearing portion is formed integrally with a part of the curved track of said track unit.

12. The cart and track arrangement as claimed in claim 9, wherein said cart further comprises a spacer ring sleeved onto said wheel axle and stopped between said cart frame and said wheel of the wheel set to prohibit said wheel set from axial displacement.

13. The cart and track arrangement as claimed in claim 12, wherein said spacer ring is disposed at a side of said wheel corresponding to a radially inward side of the curved track of said track unit.

14. The cart and track arrangement as claimed in claim 9, wherein said track unit further comprises a guide roller bearing portion; said cart further comprises at least one guide roller rotatably supported on said guide roller bearing portion of the track unit.

15. The cart and track arrangement as claimed in claim 9, wherein said second tread is located at a side of said first tread corresponding to a radially inward side of said curved track of the track unit.

16. The cart and track arrangement as claimed in claim 9, wherein said second tread is located at a side of said first tread corresponding to a radially outward side of said curved track of the track unit.

* * * * *